United States Patent [19]
Bellows et al.

[11] 3,819,256
[45] June 25, 1974

[54] APPARATUS FOR REFRACTING THE EYE

[75] Inventors: John G. Bellows, 1040 N. Lake Shore, Chicago, Ill. 60611; Howard C. Borough, Seattle, Wash.

[73] Assignee: said Bellows, by said Borough

[22] Filed: Aug. 11, 1972

[21] Appl. No.: 279,869

[52] U.S. Cl...................... 351/6, 250/200, 351/13, 351/14, 356/126, 356/128
[51] Int. Cl...................... A61b 3/00, G01n 21/46
[58] Field of Search.............. 351/6, 13, 14, 15, 16; 356/126, 128; 250/200

[56] References Cited
UNITED STATES PATENTS
3,536,383   10/1970   Cornsweet et al................ 351/16 X
3,572,909   3/1971    Van Patten............................ 351/6

OTHER PUBLICATIONS

J. Warshawsky, JOSA, Vol. 54, No. 3, 3-1964, pp. 375-379.
F. W. Campbell et al., JOSA, Vol. 49, No. 3, 3-1959, pp. 268-272.
The Optician, Vol. 152, No. 3943, 10-28-1966, pp. 433-434.
Amer. J. Optom. & Arch. Amer. Acad. Optom., Vol. 37, 1960, pp. 403-407.
J. Optom. & Arch. Amer. Acad. Optom., Vol. 39, July 1962, pp. 356-361.

*Primary Examiner*—John K. Corbin
*Assistant Examiner*—Paul A. Sacher
*Attorney, Agent, or Firm*—Arnstein, Gluck, Weitzenfeld & Minow

[57] ABSTRACT

An apparatus for refracting the eye utilizes two separate optical paths to minimize stray light and optical interference. The apparatus includes dual lens means, each disposed along one of the optical paths, for selectively varying the spatial relationship of a beam of radiant energy passing therethrough. The apparatus comprises a source of radiant energy, modulating means for forming a modulated beam of radiant energy, first lens means, projecting means for introducing a portion of the beam into the eye and for receiving and projecting a reflection of the beam from the retina of the eye along the second optical path, second lens means coupled to the first lens means, and analysis means for forming an image of the reflection and determining the sharpness of focus of the image. The modulating means comprises a dual bladed light chopper which presents to the eye an image of a moving slit representing in alternate succession two apparent sources of radiant energy at two spaced apart distances. The lens means are automatically adjusted to achieve optimum sharpness of focus and the magnitude of the correction to the lens means corresponds to the refractive correction required by the eye. Image rotation prisms are disposed along each of the optical paths and together with the analysis means through suitable electronic coupling provide an indication of the presence and magnitude of an astigmatic condition of the eye.

10 Claims, 15 Drawing Figures

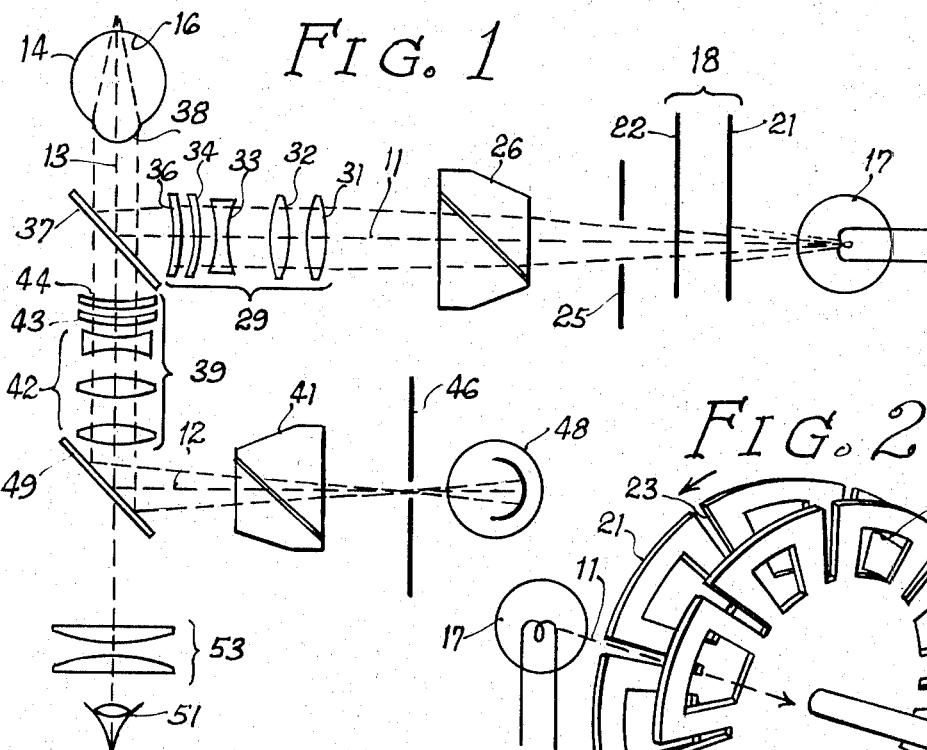
FIG. 1
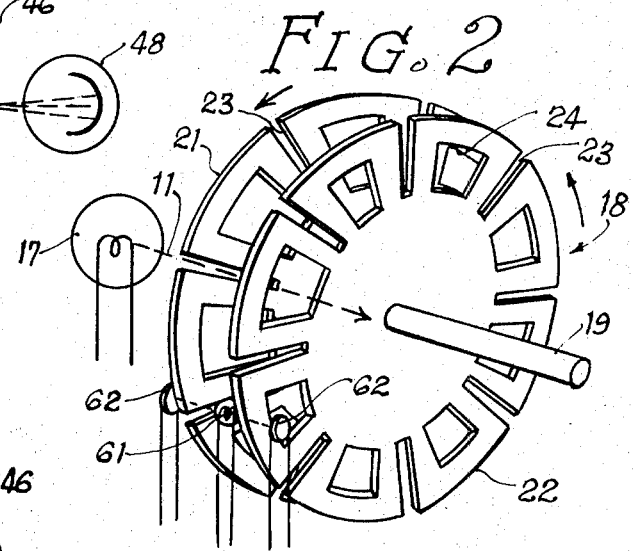
FIG. 2
FIG. 4
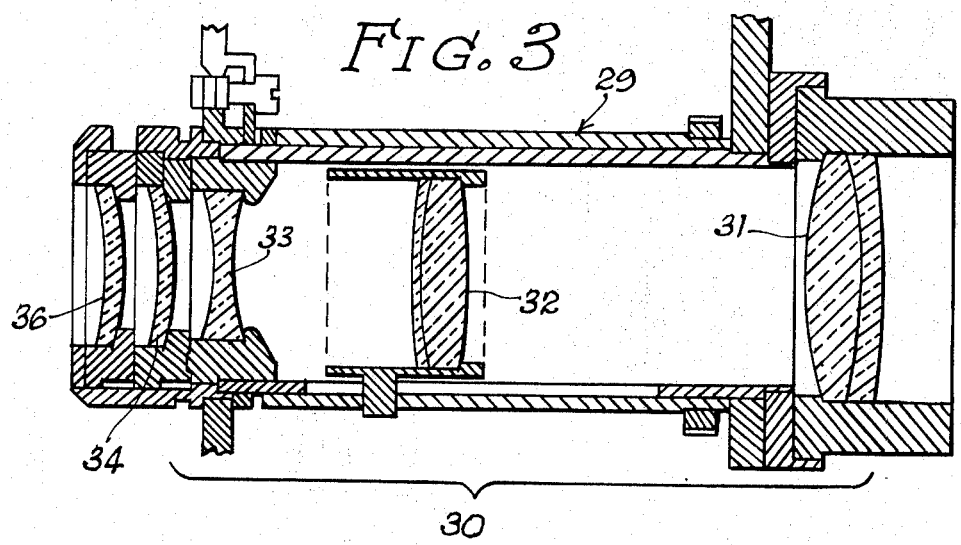
FIG. 3

APPARATUS FOR REFRACTING THE EYE

BACKGROUND OF THE INVENTION

This invention relates to an apparatus for objectively and automatically refracting the eye.

While the invention will be described in terms of its application to the testing and refractive correction of the human eye, it will be understood that it has application in the collimation or calibration of other optical systems.

Apparatus for objectively and automatically refracting the eye is disclosed in U.S. Pat. No. 3,524,702, issued Aug. 18, 1970. Although the apparatus disclosed in U.S. Pat. No. 3,524,702, is practical and useful for the refracting of the eye, the apparatus has certain disadvantages and deficiencies. For example, the apparatus utilizes a single corrective refractive lens system disposed between the patient's eye and the beam splitting element along a portion of an optical path which is used for both the incident and reflected rays with respect to the eye. In such apparatus, optical interference in the form of reflections frequently occurs within the lens element as both the incident and reflected rays pass therethrough. In addition, the apparatus utilizes a rotatable reticle and a rotatable disk light chopper. The combination of reticle and light chopper is effective to modulate the light beam and to provide a means for determining an astigmatic condition, but the apparatus presents only one apparent source of radiant energy to the patient's eye and requires a relatively complex focus sensing mechanism in view of the rotation of the image presented to the focus sensor.

SUMMARY OF THE INVENTION

Accordingly, it is an object of this invention to provide improved apparatus for objectively testing and refracting the eye which reduces stray light and optical interference between the light rays incident to and reflected from the eye.

Another object of this invention is to provide apparatus for refracting the eye which presents to the eye a moving slit image representing two apparent sources of radiant energy at two distinct effective distances.

Still another object of this invention is to provide apparatus for objectively and automatically refracting the eye which provides for the rotation of the light beam incident to the eye for the determination of an astigmatic condition, while providing for a relatively non-rotating reflected image for use in the analysis of the reflected image.

Other and further objects and advantages of this invention will become apparent from the following description when the same is considered in connection with the accompanying drawings.

The apparatus in accordance with the present invention generally utilizes the principles disclosed in U.S. Pat. No. 3,524,702, but provides improved apparatus to more efficiently utilize those principles. The apparatus of the present invention has the various elements disposed along two optical paths to minimize stray light and optical interference, commonly called "cross talk" often occurring where beams of light are travelling in two directions, essentially concurrently, through the same element. A source for generating radiant energy is disposed along a first optical path followed by modulating means aligned along that path. The modulating means modulates a portion of the radiant energy generated by the source therefor into a beam. Preferably, the modulating means includes apparatus for modulating the portion of radiant energy so as to present to the eye an image of a moving slit representing in alternating succession two apparent sources of radiant energy at two spaced apart distances. Such modulation can be provided by two apertured and slotted discs rotating on a single shaft as will be hereinafter described. The modulated light beam travelling along the first optical path passes through a refractive optical lens system which is used to determine the refractive correction required by the eye. Thereafter, the beam of radiant energy from the first optical path is directed into the patient's eye for reflection from the retina of the eye. The reflected rays pass from the eye and are directed along the second optical path, for example, by means of a beam splitter, known to the art. The reflected rays pass through a second optical lens system disposed along the second optical path which is coupled to the first optical lens system for varying the spatial relationship of the reflected rays with the first optical lens system. The reflected rays from the second optical lens system are directed along the second optical path to analysis means which forms an image of the portion of the beam of radiant energy reflected from the retina of the eye and determines the sharpness of focus of that image. The analysis means can comprise target means, such as an apertured reticle and a focus sensor such as a suitable electro-optical sensor, for example, a photo-multiplier tube. The target means serves to dissect the image of the reflected rays at one or more apertures thereof and the said image will be focused to approximately the same degree as the light rays were in focus at the fundus on the retina of the eye. The image at the target means will have lateral motion imparted to the beam by the modulating means causing the image to sweep over the target means resulting in light pulses which are detected by the focus sensor. The focus sensor, preferably, converts the pulses of light into an electrical signal which itself is a measure of the degree of focus of the image reflected by the fundus of the retina of the patient's eye. The signal from the focus sensor is utilized to provide an indication of the refractive correction required by the eye and may be utilized to control the optical lens systems to achieve optimum sharpness of focus of the instrument for the eye being refracted.

BRIEF DESCRIPTION OF THE DRAWINGS

FIG. 1 is a schematic drawing illustrating an embodiment of the invention.

FIG. 2 is a perspective view of a double-blade modulating arrangement.

FIG. 3 is a cross-sectional view of a variable power anamorphic lens system.

FIG. 4 is an elevational view of a target.

DESCRIPTION OF A PREFERRED EMBODIMENT

OPTICAL APPARATUS

Figure 5:
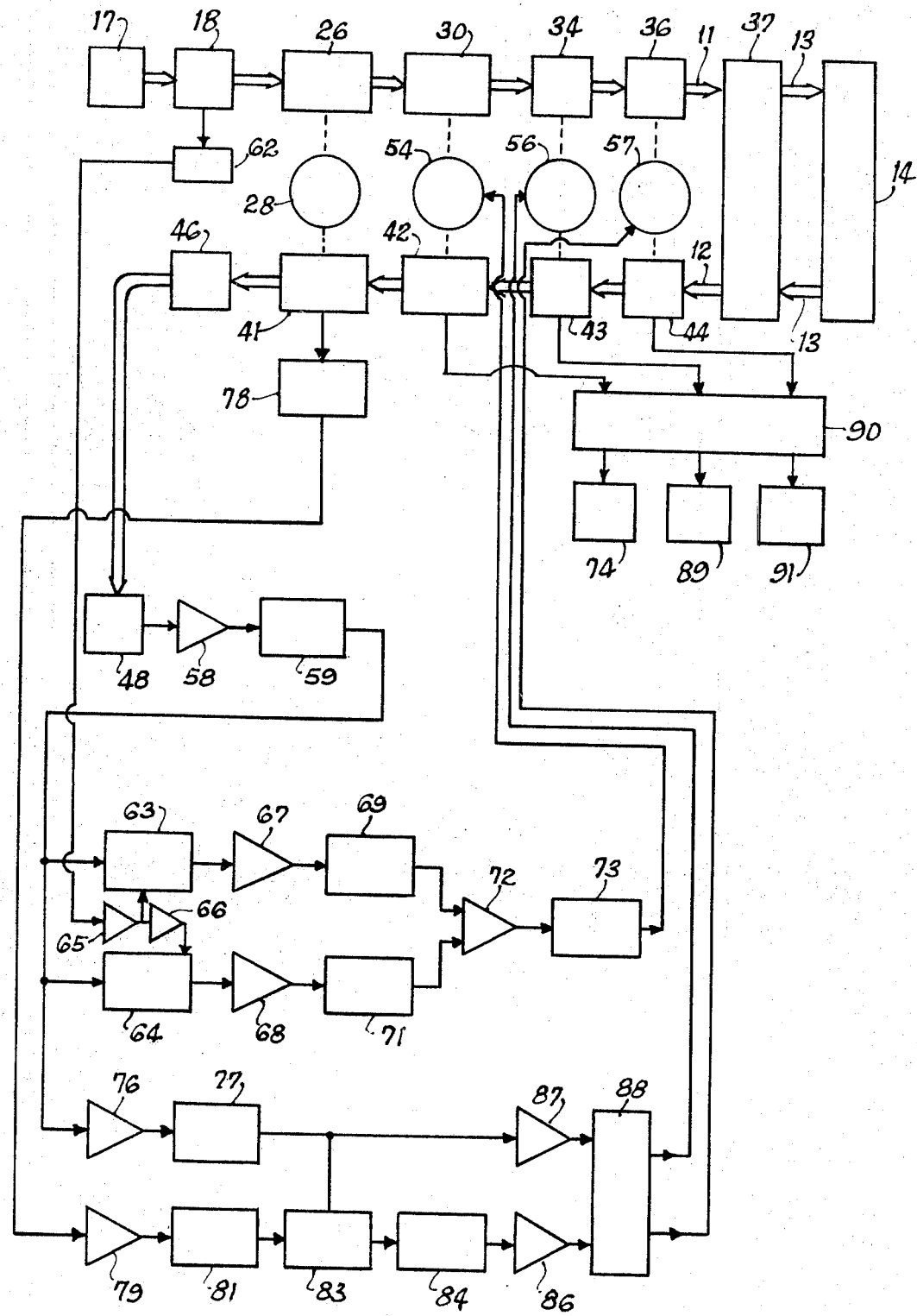
FIG. 5 is a functional block diagram illustrating a system embodying the invention.

In the construction shown in the drawings, with particular reference to FIG. 1, the numeral 11 indicates a first optical path and the numeral 12, a second optical path. The two optical paths are distinct except for a short portion of a third optical path 13 along which rays of radiant energy travel from the first optical path 11 toward the patient's eye 14 being tested and rays reflected from the retina 16 of the patient's eye 14 travel toward second optical path 12. While only a single optical system has been illustrated and will be described, it will be understood that the present invention contemplates the use of two such systems in a single apparatus so that binocular refractive tests and other tests may be made on the patient.

Arranged along first optical path 11 is a source for generating radiant energy, such as an incandescent lamp 17, as shown. One or more mirrors or lenses, or combinations thereof, (not shown) can be used to concentrate and direct the rays of radiant energy from lamp 17 along first optical path 11, as known to the art. Lamp 17 may provide continuous generation of radiant energy, for example, illumination which is directed along first optical path 11.

Aligned with lamp 17 along first optical path 11 is a two-bladed modulating arrangement indicated generally as 18 for modulating the generated light rays into a beam. As more particularly shown in FIG. 2, the modulating arrangement 18 includes a shaft 19 on which two discs 21 and 22 are fixed for rotation therewith. Each disc 21, 22 contains a plurality of spaced radially aligned slots 23 and apertures 24. The two discs are arranged on shaft 19 so that the slots 23 of disc 21 are aligned with the center of apertures 24 of disc 22 and, conversely, the slots 23 of disc 22 are aligned with the apertures of disc 21. Thus, the rays of radiant energy from lamp 17 along first optical path 11 are interrupted by the discs 21 and 22 to present to the eye 14 an image of a moving slit, that is, of slots 23, representing in alternating succession two apparent sources of radiant energy at two spaced apart distances. For example, if an image of a slot 23 of disc 21 is presented along first optical path 11, as shown in FIG. 2, the rays passing through that slot also pass unimpeded through the aligned aperture 24 of disc 22, the aperture serving to define the top and bottom of the image of the slot. Therefore, the eye 14 perceives a slot image apparently originating at disc 21. Upon rotation of the modulating arrangement 18 about the axis of shaft 19 by a suitable motor (not shown) the aperture 24 of disc 21 adjacent the aforementioned slot of that disc enters alignment with first optical path 11, as does the slot 23 of disc 22 adjacent the aforementioned aperture of that disc. In such alignment, the rays generated by lamp 17 pass unimpeded through the aperture of disc 21 until the slot of disc 22 is reached, the slot blocking all but a few of the rays. Thus, the eye 14 perceives a slot image apparently originating at disc 22. An additional aperture 25 masks the beam from the modulating arrangement 18, so that only one slot image at a time is apparent to the eye 14. Therefore, in alternate succession the eye 14 has perceived an image of a moving slit from two apparent sources of radiant energy at two spaced apart distances, the succession continuing as long as generation and modulation of the rays are maintained.

Next aligned along first optical path 11 with the modulating arrangement 18 is a first image rotation prism 26 which serves to project the moving slit image to the eye 14 at all possible angles about the axis of optical paths 11 and 13 and to provide an indication of astigmatism of the eye 14. Rotation of the image is provided by mechanical rotation of prism 26 which must have an odd number of internal reflections, such as a Pechan prism. Prism 26 can be rotated at a selected speed by a motor 28 (FIG. 5), preferably, at a rotation rate above the critical flicker fusion frequency, but below the frequency of the modulation imparted to the image by modulating arrangement 18. In this range, the patient does not perceive either the modulation or the rotation of the image. In fact, the patient perceives only a patch of illumination with fuzzy ill-defined edges absent of any visual cue for fixation and accommodative tracking.

Further along first optical path 11 and aligned therewith is a first lens system 29 for selectively varying the spatial relationship of the rays of radiant energy from prism 26. As more particularly shown in FIG. 3, lens system 29 may include a spherical power focusing section 30 and a double cylinder section. The spherical power focusing section 30 includes a positive-negative three-element mechanically compensated zoom lens comprising a fixed collimating lens 31, a movable positive zoom lens element 32, and a fixed negative zoom lens element 33. The double cylinder section comprises two cylindrical lenses, 34 and 36, which are independently rotatable about the axis of the lenses which is coincident with the axis of first optical path 11. First lens system 29 may comprise a lens system of these sections which has independently variable spherical power, cylindrical power, and cylinder axis orientation. The apparatus by which these sections are controlled and the manner in which the information obtained by such control is utilized will be hereinafter described in conjunction with the description of FIG. 5. Other anamorphic zoom lens designs with positive and negative powers can also be utilized.

The rays of radiant energy generated by lamp 17 and which have been modulated by modulating arrangement 18, rotated by prism 26 and acted upon by lens system 29 are directed along first optical path 11 toward the patient's eye 14. As shown in FIG. 1, the rays from lens system 29 are introduced into patient's eye 14 by means of beam splitter 37. Beam splitter 37 serves to define one end of first optical path 11 and to direct at least a portion of the beam from that path along a short optical path 13 into the patient's eye 14. Optical path 13 is preferably short and does not contain any of the optical elements of the apparatus to reduce the total amount of stray light and optical interference entering the system as path 13 is also utilized for rays reflected from the patient's eye 14.

Figure 6A:
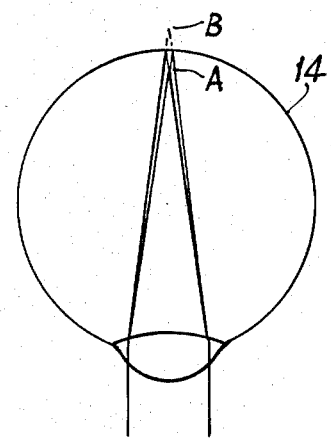
FIG. 6 is a schematic diagram of an emmetropic eye (FIG. 6a), the image therefrom as reflected and formed by the apparatus of this invention (FIG. 6b) and the time varying electrical signal obtained from said image in the apparatus of this invention (FIG. 6c).

The beam of radiant energy moving along optical path 13 from beam splitter 37 enters the patient's eye 14 with the slit image from the two apparent distances being theoretically focused along optical path 13 near or at a distance from the retina 16 depending upon the refractive correction required by the eye 14. For example, as shown in FIG. 6a with the apparatus calibrated for the emmetropic eye, if eye 14 is an emmetropic eye, the slit image will be close to focus with the point of focus A for the image of slots 23 of disc 21 being just in front of the retina 16 of the eye 14 and the point of focus B for the image of slots 23 of disc 22 being just behind the retina 16. A myopic eye will focus the image forwardly of these points in relation to the retina as in FIG. 7a, while a hypermetropic eye will focus rearwardly of these points in relation to the retina 16, as in FIG. 8a.

Figure 7A:
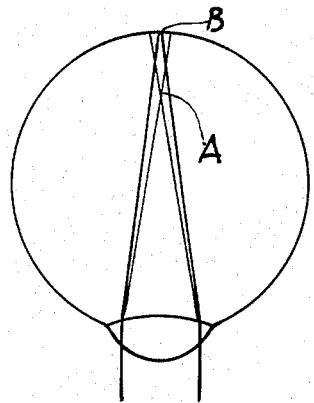
FIG. 7 is a schematic diagram of a myopic eye prior to compensating lens adjustment (FIG. 7a), the image therefrom as reflected and formed by the apparatus of this invention (FIG. 7b) and the electrical signal obtained from said image in the apparatus of this invention (FIG. 7c).
Figure 8A:
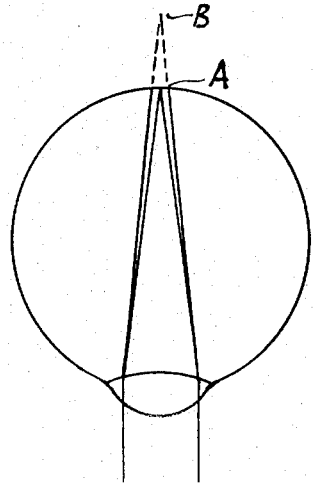
FIG. 8 is a schematic diagram of a hypermetropic eye prior to compensating lens adjustment (FIG. 8a), the image therefrom as reflected and formed by the apparatus of this invention (FIG. 8b) and the electrical signal obtained from said image in the apparatus of this invention (FIG. 8c).

A portion of the radiant energy incident to the eye is reflected by the retina 16 back through the lens 38 of the eye 14 along optical path 13 toward beam splitter 37. The sharpness of focus of the image is directly related to the refractive condition of the eye 14, that is, the distance of the center between the two points of focus of the image A and B, from the retina, as shown in FIGS. 6a, 7a, and 8a. Thus, for the emmetropic eye the distances between A and the retina 16, and B and the retina 16 are approximately equal, (FIG. 6a) and the focus of the two images will be equally sharp. Beam splitter 37 receives the portion of the beam of incident rays reflected from the retina 16 and projects at least a portion thereof along second optical path 12.

Aligned along second optical path 12 is a second lens system 39 and a second image rotation prism 41. Second lens system 39 can be identical to first lens system 29, for example with an identical spherical power focusing section 42 and an identical double cylinder section having cylindrical lenses 43 and 44. Second lens system 39 can be coupled to first lens system 29 for varying the spatial relationship of the reflected portion of the beam moving along second optical path 12 with and to the same extent as the beam moving along first optical path 11 is varied by first lens system 29. Similarly, prism 41 can be identical to prism 26 and can be coupled thereto to rotate prism 41 at the same speed. Prism 41 serves to "derotate" the image in the reflected beam, i.e., to remove the apparent rotation of the image imparted by first prism 26.

Figure 6B:
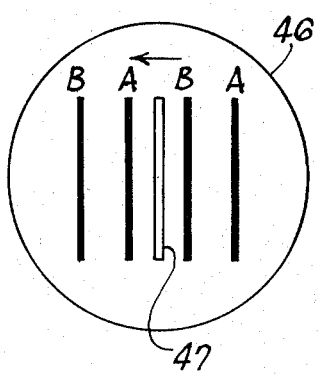
Figure 7B:
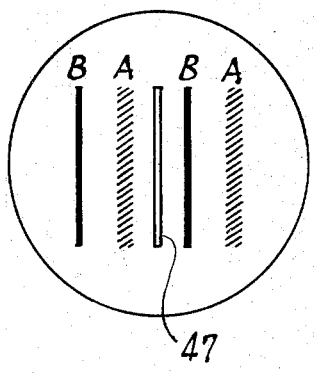
Figure 8B:
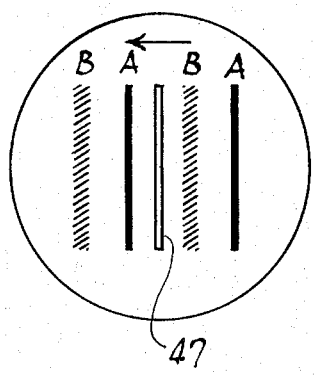

A target, such as an apertured reticle 46 is aligned along second optical path 12 at which the reflected beam forms an image which is focused to approximately the same degree as the light rays were in focus at the fundus of the retina 16 of eye 14, for example, as shown in FIGS. 6b, 7b and 8b. Reticle 46, preferably, has a plurality of radial slot apertures 47, as shown in FIG. 4, radially aligned with the slots of the discs 21 and 22. Alternatively, a reticle with a single slot aperture (not shown) can be used.

Figure 6C:
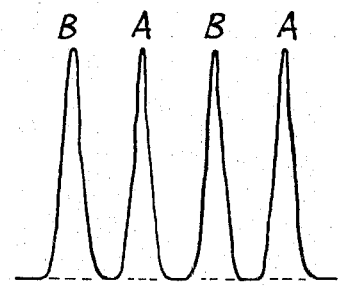
Figure 7C:
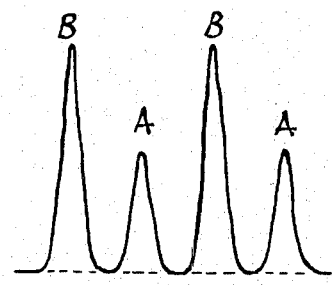
Figure 8C:
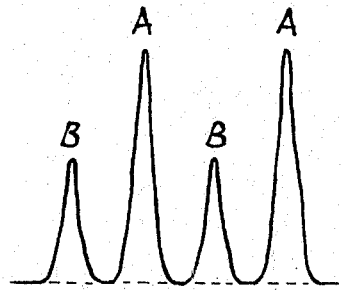

Optical path 12 is terminated at a radiant energy sensor, such as photo-multiplier tube 48. Tube 48 detects light pulses passing through apertures 47 of reticle 46 and converts the light pulses into an electrical signal which correspond to the degree of focus of the image reflected by the fundus of the retina 16 of eye 14. FIGS. 6c, 7c and 8c are illustrative of the electrical signal obtained for the emmetropic, myopic and hypermetropic eyes shown in FIGS. 6a, 7a and 8a, respectively. The utilization of the electrical signal in the present invention will be hereinafter described. Optical path 12 is shown in FIG. 1 as being folded through the use of a mirror 49. However it is understood that optical path 12 may be a straight path, thus eliminating the need for mirror 49. By using a folding or movable mirror for mirror 49, and moving the mirror out of the second optical path 12, the apparatus can be utilized for visual examination of retina 16 by an operator 51 through an eye piece lens 53.

In addition, the apparatus can be used to subjectively test the refractive correction of the eye 14, for example, to confirm a correction previously indicated objectively by the apparatus, by inserting a mirror (not shown) and one or more back-illuminated visual acuity or other charts (not shown) into the first optical path 11, or second optical path 12, as described in U.S. Pat. No. 3,524,702. The optical magnification of the apparatus is such that the charts may be of microfilm dimensions resulting in a compact machine wherein even the use of charts may be readily automated.

MECHANICAL APPARATUS

Referring particularly to FIG. 5, the apparatus of this embodiment of the present invention utilizes motor 28 to rotate prisms 26 and 41 synchronously; a motor 54, such as a servo motor, to control the spherical power focusing sections 30 and 42 of lens systems 29 and 39, respectively; and a pair of motors 56 and 57, such as a pair of servo motors, to synchronously control the first cylindrical elements 34 and 43 of each of lens systems 29 and 39, and the second cylindrical elements 36 and 44 of each of lens systems 29 and 39, respectively. The shafts (not shown) of these motors can be connected by suitable gear systems to mechanisms supporting the corresponding lens elements as is known to the art. The motors 54, 56 and 57 have the capability of rotating their output shafts in either of two directions and are controlled by electronic motor controllers as will be hereinafter described.

ELECTRONIC APPARATUS

As stated above, the optical elements of the apparatus are controlled by the electronic components of the apparatus, and the correction required by the eye 14 is determined and indicated by these electronic components. In operation of the apparatus, the lamp 17 is energized and the eye 14 to be tested is brought into position in alignment with optical path 13 at a predetermined distance from beam splitter 37. Modulating arrangement 18 is rotated at a constant speed as heretofore described and motor 28 is energized to rotate prisms 26 and 41 at a predetermined speed. Under these conditions an image in the form of light pulses sweeps past the aperture 47 of reticle 46, as in FIGS. 6b, 7b or 8b, and photomultiplier tube 48 converts the light pulses to an electrical signal whose characteristics are a measure of the degree of focus of the instrument including the patient's eye 14, as shown in FIGS. 6c, 7c or 8c.

Referring to FIG. 5, the electrical signal from photomultiplier tube 48 is amplified by an amplifier 58 and filtered through a low frequency filter 59. The amplified and filtered signal contains the information from the image of both apparent radiant energy sources resulting from the action of the modulating arrangement 18. The separation of the two components of the signal is effected through the creation of a reference signal.

As more particularly shown in FIG. 2, a small lamp 61 is mounted between discs 21 and 22 aligned with the slots 23 and apertures 24 of the discs, or reference slits (not shown), so that light from lamp 61 is aligned with a slot 23 radially outside of aperature 24 of each disc whenever another slot of that disc is aligned with lamp 17 along optical path 11. The slots 23 extend to the edge of the discs 21 and 22, whereas the apertures 24 do not. A pair of photodiodes 62 aligned with lamp 61 on the opposite side of each of discs 21 and 22, provides a reference signal indicative of which disc is providing the slot 23 which is the apparent source of the image appearing at reticle 46 at a particular instant. Alternatively, a single photodiode can be used in place of the pair of photodiodes 62, by using suitable electronic timing circuits or by widening the slots 23 equal to the spacing between the slots and utilizing a "flip-flop" switch circuit to indicate which disc is the apparent source of the slot image at any instant.

The reference signal from photodiodes 62 is used to operate two analog switches 63 and 64 by passing the signal through two gating circuits 65 and 66. It is assumed for the purpose of this description that the circuits and switches are connected so that the portion of the signal resulting from the use of the slots 23 of disc 21 correspond with channel A and that the portion of the signal resulting from the use of the slots 23 of disc 22 correspond with channel B. As shown in FIG. 5, the electrical signal from filter 59 is fed to both switches 63 and 64 which separates the signal into two signals, A and B, respectively, corresponding to whichever switch is made operative by the gating circuits 65, 66. Signals A and B are amplified and filtered through amplfiers 67 and 68 and filters 69 and 71, and then compared in a differential amplifier 72 which generates a signal which is proportional to the difference between the two input signal, A and B, and provides an indication of the direction and magnitude of correction required to achieve optimum sharpness of focus. The signal from the differential amplifier 72 is fed to an electronic motor control circuit 73 where the signal is utilized to energize motor 54 to control spherical power focusing sections 30 and 42 of the lens systems 29 and 39, respectively. In this manner the lens systems are adjusted for spherical power so as to achieve optimum sharpness of focus for the apparatus including the patient's eye 14. Upon the spherical power focusing sections 30 and 42 of the lens systems reaching adjustment for optimum sharpness of focus, the electrical signals A and B will be equal, similar to the signal shown in FIG. 6c, and differential amplifier will cease to generate a differential signal, a null condition having been attained. The movement required by the spherical power focusing sections in attaining the desired condition is indicated on position sensing apparatus 74, such as a meter or gauge.

In a similar manner, correction is made for an astigmatic condition. The presence of astigmatism in the image at reticle 46 will result in the electrical signal fluctuating at the frequency of the image rotation induced by the rotating prism 26. The magnitude of the fluctuation at the image rotation frequency is a measure of the magnitude of the astigmatism and the time relationship of the signal to a reference signal will indicate the location of the astigmatic axis. In particular, the amplified and filtered electrical signal from filter 59 is fed to an amplfier 76 for further amplification, as well as to analog switches 63 and 64 as described above. The further amplified signal from amplifer 76 is passed through a bandpass filter 77 which is tuned to the image rotation frequency.

The reference signal for astigmatism is obtained by a reference signal generator 78 coupled to the image rotation prisms 26 and 41 and the motor 28, the signal being amplified by amplifier 79, acted upon by squaring circuit 81. A comparison of the time phase of this reference signal with the phase of the signal from filter 77, which represents the magnitude of the astigmatism, is made by analog switch 83. The resulting signal (phase signal) indicates the astigmatism angle and is further filtered by filter 84 and amplified by amplfier 86. The signal from filter 77 is also amplified, by amplifier 87, and both signals are fed to motor control circuit 88 which controls motors 56 and 57 coupled to cylindrical power and axis elements 34, 36, 43, and 44. These cylindrical elements will be rotated by the motors to the proper net angle of each element to its adjacent element to match the astigmatic axis of the eye 14 and then counter-rotated until the astigmatism magnitude signal is reduced below a threshold value. At this point the lens systems 29 and 39 contain the corrective prescription of the patient's eye and position sensor 74 as well as similar position sensors 89 and 91, all of which are controlled by an analog computer 90, will display the prescription as hereinafter described.

Figure 9:
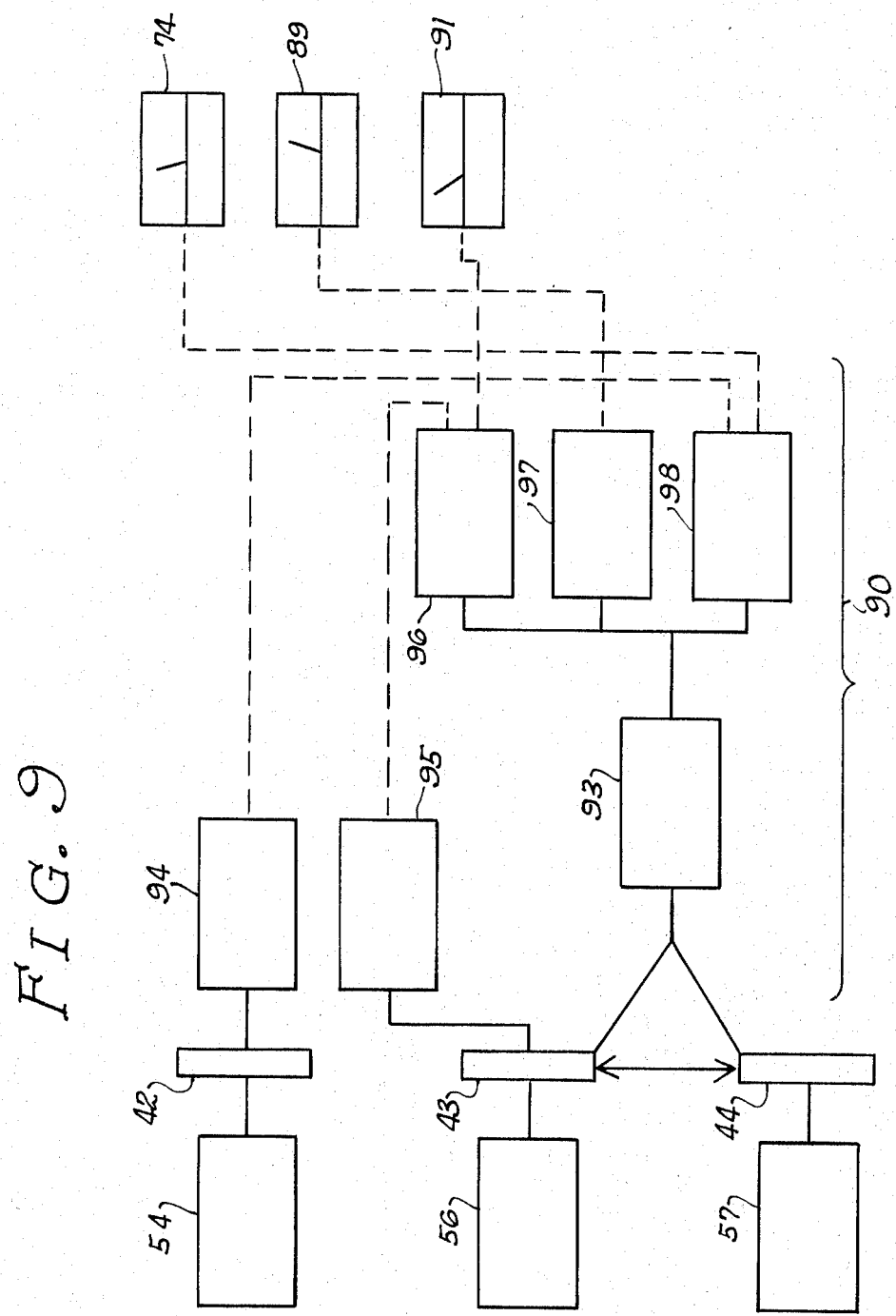
FIG. 9 is a functional block diagram illustrating in detail a portion of the system shown in FIG. 5.

The conversion of the lens element position data into conventional eye class prescription information requires some minor computation and may be accomplished with an analog computer 90 as shown in FIG. 9. The total spherical power is the sum of the spherical power indicated by a position sensor 94, which senses the position of spherical power focusing section 30 or 42 (only section 42 being shown in the drawing), and a contribution due to the cylindrical (crossed) lenses 43 and 44 (lenses 34 and 36 alternatively may be used). Position sensor 94 can be a linear potentiometer coupled to the spherical power focusing section 42 and/or section 30 or the motor 54, desirably, for example, having a value of approximately 100 megohms. A differential gear coupling 93 coupled to cylindrical lenses 43 and 44, or their motors 56 and 57, respectively, indicates the relative angle between the two cylinder axes thereof independent of their absolute rotational positions. The contribution to the total spherical power due to the cylindrical elements 43 and 44 is measured by 1-cosine of the angle (angle $\phi$) between their two cylinder axes and is sensed by a special function (1-cosine $\phi$) potentiometer 98 attached to the output of the differential gear coupling 93. Potentiometer 98, for example, can have a value of approximately 20 megohms. The total spherical power is displayed on position sensor 74, which may be a meter or indicator calibrated in accordance with potentiometers 94 and 98. The net cylindrical power of the cylindrical lens combination is determined by the cosine of the said relative angle (cosine $\phi$) and is sensed by potentiometer 97 and displayed by a position sensor 89, such as a meter calibrated thereto. Potentiometer 97, for example, can have a value of approximately 100 megohms. The composite cylinder angle is determined by the absolute rotational position of one of the cylindrical lenses 43 and 44, such as 43 as shown, used as a reference, and is sensed by a linear potentiometer 95. Potentiometer 95, for example, can have a value of approvimately 180 megohms with a calibrated range of one megohm per degree of angular rotation. The signal from potentiometer 95 is added to half the rotational angle (angle $\phi$) between the cylindrical lenses 43 and 44, sensed by potentiometer 96 and the resulting value displayed by meter 91 calibrated thereto. Potentiometer 96, for example, can have a value of approximately 45 megohms with a range of 0.5 megohm per degree of angular rotation.

It is understood that this computation may be provided by other means, such as a correction in the optics, by digital computer or other means, as well as the analog computer described above.

Various changes coming within the spirit of our invention may suggest themselves to those skilled in the art; hence we do not wish to be limited to the specific embodiment shown and described or uses mentioned, but intend the same to be merely exemplary, the scope of our invention being limited only by the appended claims.

We claim:

1. An apparatus for testing the eye comprising
   a. a source for generating radiant energy;
   b. modulating means aligned with said source along a first optical path for modulating a portion of the radiant energy generated by said source into a beam,
   c. first lens means aligned along said first optical path for selectively varying the spatial relationship of said beam of radiant energy,
   d. projection means aligned along said first optical path for introducing into the eye at least a portion of said beam of radiant energy from said first lens means and for receiving and projecting along a second optical path at least a portion of a beam of radiant energy reflected from the retina of the eye upon introduction of said portion of said first beam into the eye;
   e. second lens means aligned along said second optical path and being coupled with said first lens means for varying the spatial relationship of said reflected portion from said projection means with said first lens means; and
   f. analysis means for forming an image of said portion of the beam of radiant energy reflected from the retina of the eye and for determining the sharpness of focus of said image.

2. The apparatus as defined in claim 1 wherein said analysis means includes means responsive to the sharpness of focus of said image for controlling said first and second lens means to achieve optimum sharpness of focus of the image.

3. The apparatus as defined in claim 2 wherein said analysis means comprises
   a. target means aligned along said second optical path for translating at least a part of said portion of the beam of radiant energy reflected from the retina of the eye into focused modulated pulses of radiant energy;
   b. radiant energy detecting means responsive to said modulated pulses of radiant energy to receive said pulses and transmit a signal which is modulated in accordance with the sharpness of focus of said modulated pulses of radiant energy, and
   c. control means responsive to said signal which is modulated in accordance with the said sharpness of focus for controlling said first and second lens means to achieve optimum sharpness of focus of the said modulated pulses of radiant energy at said target means.

4. The apparatus as defined in claim 1 wherein said modulating means includes means for modulating said portion for presenting to the eye an image of a moving slit representing in alternating succession two apparent sources of radiant energy at two spaced apart distances.

5. The apparatus as defined in claim 4 wherein said analysis means includes means responsive to the sharpness of focus of said image in conjunction with said modulating means for controlling said first and second lens means to achieve optimum sharpness of focus of said image.

6. The apparatus as defined in claim 1 wherein said first lens means and said second lens means each comprise a lens system of independently variable spherical power, cylindrical power, and cylinder axis orientation.

7. The apparatus as defined in claim 6 wherein said modulating means includes means for modulating said portion for presenting to the eye an image of a moving slit representing in alternating succession two apparent sources of radiant energy at two spaced apart distances, and wherein said analysis means includes spherical power control means responsive to said sharpness of focus of said image in conjunction with said modulating means for controlling said variable spherical power of said first and second lens means to achieve optimum sharpness of focus.

8. The apparatus as defined in claim 1 including first image rotation means interposed and aligned along said first optical path for rotating said beam of radiant energy about the axis of said first optical path in a first direction, and second image rotation means interposed and aligned along said second optical path for rotating said reflected portion about the axis of said second optical path in a direction opposite to said first direction, said second image rotation means being coupled to said first image rotation means to rotate therewith at the same rotational speed, and said first and second image rotation means in conjunction with said analysis means providing indication of the presence and magnitude of astigmatism of the eye.

9. An apparatus for testing the eye comprising
   a. source means for generatng radiant energy;
   b. modulating means aligned with said source means along a first optical path for modulating a portion of the radiant energy generated by said source means into a beam for presenting to the eye an image of a moving slit representing in alternate succession two apparent sources of radiant energy at two spaced apart distances;
   c. first image rotating means alinged along said first optical path for rotating said beam of radiant energy modulated by said modulating means about the axis of said first optical path in a direction; direrecton;
   d. first lens means aligned along said first optical path for selectively varying the spatial relationship of said beam of radiant energy from said first image rotation means comprising a lens system of independently variable spherical power, cylindrical power, and cylinder axis orientation;

e. projection means aligned along said first optical path for introducing into the eye at least a portion of said beam of radiant energy from said first lens means and for receiving and projecting along a second optical path at least a portion of a beam of radiant energy reflected from the retina of the eye upon introduction of said first beam into the eye;

f. second lens means aligned along said second optical path and being coupled with said first lens means for varying the spatial relationship of said reflected portion from said projection means with said first lens means, said second lens means comprising independently variable spherical power, cylindrical power and cylinder axis orientation;

g. second image rotation means aligned along said second optical path for rotating said reflected portion from said second lens means about the axis of said second optical path in a direction opposite to said first direction, said second image rotation means being coupled to said first image rotation means to rotate therewith at the same rotational speed; and h. analysis means for analyzing the spatial relationship of said reflected portion from said second rotation means comprising 1. target means aligned along said second optical path for translating at least a part of said reflected portion into focused modulated pulses of radiant energy,
2. radiant energy detecting means responsive to said modulated pulses of radiant energy for analyzing the sharpness of focus thereof,
3. spherical power control means responsive to said sharpness of focus in conjunction with said modulating means for controlling said variable spherical power of said first and second lens means to achieve optimum sharpness of focus, and
4. cylindrical power control means responsive to said sharpness of focus in conjunction with the rotation of said first and second image rotation means for controlling said variable cylindrical power and cylinder axis orientation of said first and second lens means to achieve optimum sharpness of focus.

10. The apparatus of claim 9 wherein said radiant energy detecting means includes means to receive said modulated pulses of radiant energy and transmit a signal which is modulated in accordance with the sharpness of focus of said modulated pulses of radiant energy, said spherical power control means being operable to control said variable spherical power of said first and second lens means to achieve optimum sharpness of focus in accordance with said signal in conjunction with said modulating means, and said cylindrical power control means being operable to control said cylindrical power and cylinder axis orientation of said first and second lens means to achieve optimum sharpness of focus in accordance with said signal in conjunction with the rotation of said first and second image rotation means.

* * * * *

UNITED STATES PATENT OFFICE
CERTIFICATE OF CORRECTION

Patent No. 3,819,256           Dated June 25, 1974

Inventor(s) Dr. John G. Bellows and Howard C. Borough

It is certified that error appears in the above-identified patent and that said Letters Patent are hereby corrected as shown below:

IN THE SPECIFICATION

Column 8, line 31, "class" should read --glass--,
Column 9, line 1, "approvimately" should read --approximately--.

IN THE CLAIMS:

Claim 9, Column 10, line 49, "generatng" should read --generating--;
line 57, "rotating" should read --rotation--;
lines 60 and 61, "direction; direction;" should read --first direction;--.

line 57, "alinged" should read -- aligned -- .

Signed and sealed this 22nd day of October 1974.

(SEAL)
Attest:

McCOY M. GIBSON JR.
Attesting Officer

C. MARSHALL DANN
Commissioner of Patents